United States Patent [19]

Roth

[11] 4,184,287

[45] Jan. 22, 1980

[54] PLANT-GROWING DEVICE WITH A WATER RESERVOIR

[76] Inventor: Jacques Roth, 13, quai Mullenheim, Strasbourg (Bas-Rhin), France

[21] Appl. No.: 948,764

[22] Filed: Oct. 3, 1978

Related U.S. Application Data

[63] Continuation of Ser. No. 729,776, Oct. 5, 1976, abandoned.

[30] Foreign Application Priority Data

Oct. 28, 1975 [FR] France .................. 75 33724

[51] Int. Cl.² ............................ A01G 27/00
[52] U.S. Cl. ............................................ 17/81
[58] Field of Search ................ 47/66, 79, 80, 81

[56] References Cited

U.S. PATENT DOCUMENTS

| 262,379 | 8/1882 | Dean | 47/81 |
|---|---|---|---|
| 2,638,716 | 5/1953 | Luipersbek | 47/79 |
| 2,803,091 | 8/1957 | Radford | 47/80 |
| 3,261,125 | 7/1966 | Arkebauer | 47/81 |
| 3,576,088 | 4/1971 | Arca | 47/81 |
| 3,958,366 | 5/1976 | Meyers | 47/81 |
| 3,962,824 | 6/1976 | Poston | 47/81 |

FOREIGN PATENT DOCUMENTS

| 2061201 | 6/1971 | Fed. Rep. of Germany | 47/80 |
|---|---|---|---|
| 1005287 | 4/1952 | France | 47/81 |
| 1263364 | 5/1961 | France | 47/80 |
| 95471 | 1/1971 | France | 47/80 |
| 2067474 | 8/1971 | France | 47/79 |
| 474211 | 8/1969 | Switzerland | 47/80 |
| 971032 | 9/1964 | United Kingdom | 47/80 |

*Primary Examiner*—Edgar S. Burr
*Assistant Examiner*—James R. Feyrer
*Attorney, Agent, or Firm*—Young & Thompson

[57] ABSTRACT

The disclosure is of a plant-growing device comprising a container of which the lower part forms a water reservoir with a sight-glass, a plate covering the reservoir and supporting a mass of rooting medium, and a water-supply channel for the introduction of water to the reservoir, the plate being foraminous for the aeration of the rooting medium and penetrated by tubes of which the lower ends dip into the water in the reservoir, the tubes containing capillary material and being selectively closable.

1 Claim, 1 Drawing Figure

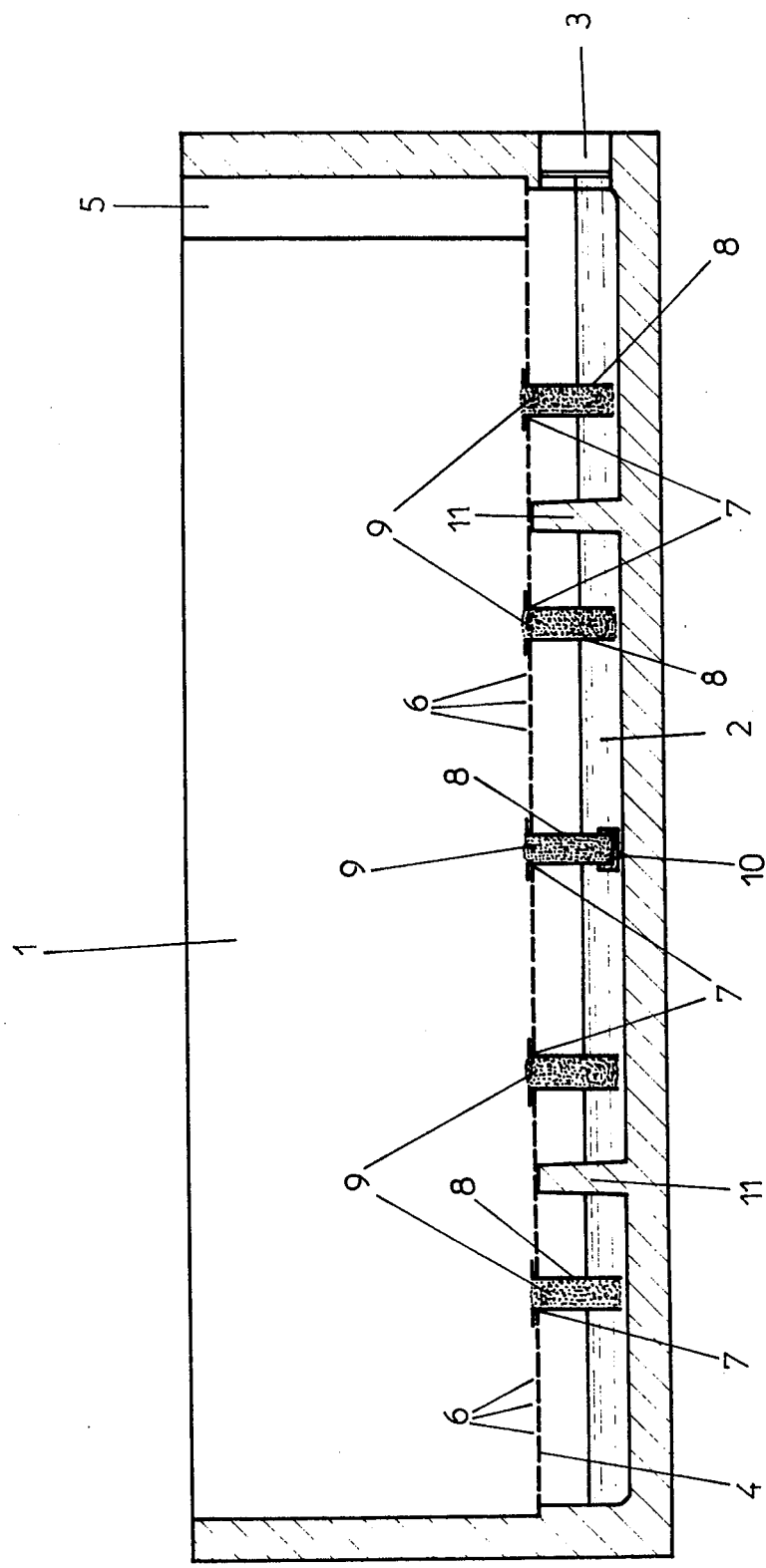

PLANT-GROWING DEVICE WITH A WATER RESERVOIR

This is a continuation application Ser. No. 729,776, filed Oct. 5, 1976 now abandoned.

INTRODUCTION AND BACKGROUND OF THE INVENTION

The present invention relates generally to the manufacture of plant-growing devices, for example jardinieres and troughs intended to receive plants for forming so-called indoor gardens, and one object of the invention is to provide an improved plant-growing device comprising a water reservoir and means for regulating the supply of water to the plants.

The problem of the transfer of water to the plants rooted in the earth or compost or other rooting medium contained in the known plant-growing devices, particularly flowering plants and foliage plants, has always been very troublesome and has led to the creation of various devices comprising reservoirs of water for automatically supplying water to the rooting medium in which the plants are growing.

In practice there already exist jardinieres of which the lower parts constitute water reservoirs and in which the rooting medium rests upon grilles fixed horizontally at some distance above the water level. In these known jardinieres the supply of the water to the plants is effected by means of bands of cloth made of synthetic fibres and of a length exceeding that of the grilles, and on the lower surface of the latter the cloth is stuck over a part of its length, the part which is not stuck dipping down into the water in the reservoir. By means of this dipping part of the cloth and by capillarity the water moistens the whole of the cloth and impregnates the rooting medium disposed upon the grille, thus permitting the supply of water to the plants.

However, with the known devices the supply of water is a function of the capillary power and the quality of the cloth and regulation of the water supply is not possible, which can conduce to deprivation of the plants which have a great need of water, for example ferns or the like, or too much water may be supplied to plants which do not need a lot of water, for example cacti.

Therefore another object of the present invention is to mitigate these disadvantages.

BRIEF SUMMARY OF THE INVENTION

According to the present invention there is provided a plant-growing device with a water reservoir and means for supplying water in regulatable manner from the reservoir to a mass of rooting medium, the device comprising a container of which the lower part forms the reservoir and is provided with a sight-glass to permit supervision of the water level, a plate extending over and covering the reservoir and supporting the rooting medium in which the plants are to grow, and a watersupply channel for the introduction of water to the reservoir, characterised in that the plate is provided all over its surface with multitudinous small holes for the aeration and drainage of the rooting medium, and distributed over the area of the plate there are larger holes through which extend tubes open at their upper ends to the rooting medium and dipping with their lower ends into the water in the reservoir, the tubes containing a watercompatible material which by capillarity transfers water from the reservoir to the rooting medium, at least some of the tubes being open at their lower ends.

FURTHER DESCRIPTION AND ADVANTAGES OF THE INVENTION

According to an optional feature of the invention any one or more of the tubes may be provided at its lower end with a stopper, the closing of one or more of the tubes permitting the regulation of the supply of water.

How the invention may be put into practice appears from the following description of a preferred embodiment given by way of example and illustrated in the accompanying schematic drawing.

BRIEF DESCRIPTION OF THE VIEW IN THE DRAWING

The single FIGURE in the accompanying drawing is a diagrammatic sectional elevation of a jardiniere in conformity with the invention, without the rooting medium and plants.

DETAILED DESCRIPTION OF THE PREFERRED EMBODIMENT

As shown in the accompanying drawing the jardiniere with a reservoir of water and means for regulating the supply thereof comprises basically a trough or container 1 of which the lower part forms a reservoir 2 for water provided with a sight-glass 3 for supervision of the water level. A plate 4 extends over and covers the reservoir 2 and is intended to support the earth or other rooting medium in which the plants are to grow. The reservoir 2 is further provided with a water-supply channel 5. The device is characterised in that the plate 4 is foraminous, being provided all over its surface with a multitude of small holes 6. The plate 4 is also provided with several holes 7 of larger diameter and distributed over the area of the plate 4 in any convenient manner, and in these holes 7 are located upright tubes 8 which are mostly open at both ends. These tubes 8 dip into the water in the reservoir 2 and contain a hydrophilic capillary material 9 which by its capillarity supplies water to the rooting medium and plants.

Any one of the tubes 8 may be provided at its lower end with a stopper 10. It is thus possible to act directly upon the supply of water reaching the plants which are rooted above one or more of the tubes 8, according to the requirements for water of these plants.

In accordance with a further feature of the invention the base of the reservoir 2 is provided with a plurality of pillars or upstanding portions 11 which serve to support the plate 4. The margins of the plate 4 rest upon an internal ledge formed in the container 1.

A jardiniere or device in conformity with the invention preferably comprises a container made of moulded foamed polyurethane, the portions 11 being preferably moulded directly with the container 1.

In conformity with a further feature of the invention the hydrophilic material 9 consists for preferance of a hydrophilic foamed polyurethane or foamed phenolic material.

With the aid of a device in conformity with the invention it is possible to regulate the supply of water to the plants more or less precisely as a function of their requirements.

The invention is more particularly applicable in relation to the culture of indoor plants.

It will be understood that the invention is not limited to the manner of construction described with reference to and illustrated in the accompanying drawing. Modifications remain possible, notably from the point of view of the construction of the various elements without departing from the scope of protection of the invention.

What is claimed is:

1. A plant-growing device with a water reservoir and means for supplying water in regulatable manner from the reservoir to a mass of rooting medium, the device comprising a container of which the lower part forms the reservoir and is provided with a sight-glass to permit supervision of the water level, a plate extending over and covering the reservoir for supporting a rooting medium in which the plants are to grow, and a water-supply channel for the introduction of water to the reservoir, characterized in that the plate is provided all over its surface with multitudinous small holes for the aeration and drainage of the rooting medium, and distributed over the area of the plate there are larger holes through which extend tubes open at their upper ends to the rooting medium and dipping with their lower ends into the water in the reservoir, the tubes containing a water-compatible material which by capillarity transfers water from the reservoir to the rooting medium, at least some of the tubes being open at their lower ends, and means for regulating the supply of water to the rooting medium comprising a plurality of stoppers whereby the lower end of at least one of said tubes may be selectively closed by one of said stoppers for the purpose of preventing the transmission of water to the rooting medium through said at least one of said tubes, the bottom part of the container having upstanding pillar-like portions spaced inwardly from the side walls of the container molded directly therewith for supporting the plate, the container having a ledge upon which the margins of the plate rest, the water-compatible material being capillary foamed hydrophilic synthetic plastic material which substantially fills each of said tubes and extends no lower than the lower ends of the tubes.